(12) United States Patent
Huwiler et al.

(10) Patent No.: US 8,704,465 B2
(45) Date of Patent: Apr. 22, 2014

(54) SPRING-LOADED DRIVE WITH ACTIVE FEEDBACK IN DC CIRCUIT

(71) Applicant: Siemens Aktiengesellschaft, Munich (DE)

(72) Inventors: Adrian Huwiler, Honau (CH); Ronald Reichmuth, Einsiedeln (CH); Daniel Schoop, Zug (CH)

(73) Assignee: Siemens Aktiengesellschaft, Munich (DE)

( * ) Notice: Subject to any disclaimer, the term of this patent is extended or adjusted under 35 U.S.C. 154(b) by 82 days.

(21) Appl. No.: 13/624,746

(22) Filed: Sep. 21, 2012

(65) Prior Publication Data

US 2013/0076276 A1 Mar. 28, 2013

(30) Foreign Application Priority Data

Sep. 26, 2011 (EP) ..................................... 11182832

(51) Int. Cl.
*H02K 7/10* (2006.01)
*H02K 17/32* (2006.01)
*H02K 23/68* (2006.01)

(52) U.S. Cl.
USPC ............ 318/127; 318/150; 318/160; 318/161

(58) Field of Classification Search
CPC ....................................................... H02K 33/02
USPC ................................... 318/127, 150, 160, 161
See application file for complete search history.

(56) References Cited

U.S. PATENT DOCUMENTS

| | | | |
|---|---|---|---|
| 6,100,655 A * | 8/2000 | McIntosh ...................... 318/159 |
| 7,425,807 B1 * | 9/2008 | Perkins et al. ................ 318/161 |
| 8,162,596 B1 * | 4/2012 | Kamio ........................... 415/119 |
| 8,314,580 B2 * | 11/2012 | Grogg et al. ............. 318/400.34 |
| 2006/0097671 A1 | 5/2006 | Yoshida |
| 2009/0009115 A1 | 1/2009 | Grogg et al. |
| 2010/0007301 A1 | 1/2010 | Ochsenbein et al. |

FOREIGN PATENT DOCUMENTS

| | | |
|---|---|---|
| AT | 507588 A4 | 6/2010 |
| DE | 102005031514 A1 | 1/2007 |
| DE | 102009007562 A1 | 8/2010 |
| EP | 1 655 165 A2 | 5/2006 |
| EP | 11182832 | 9/2011 |
| JP | 1-165974 | 6/1989 |
| JP | 11-65679 | 3/1999 |
| WO | 2005/119898 A2 | 12/2005 |

* cited by examiner

*Primary Examiner* — Erick Glass
(74) *Attorney, Agent, or Firm* — Staas & Halsey LLP

(57) ABSTRACT

A motor control of a motor has a DC circuit with a back-up capacitor and a switching device that can connect a motor to the back-up capacitor. A spring device applies a restoring force to the rotor of the motor when deflected from an idle position. When the DC Circuit feeds energy into the back-up capacitor from a power supply network, a control device activates switching elements of the switching device to adjust an actual deflection of the rotor to a required deflection. When the rotor is deflected from the idle position and the back-up capacitor receives no energy from the power supply network, the control device, supplied with energy by the back-up capacitor, sets the required deflection to the idle position and activates the switching elements such that the motor, upon being restored by the spring device, feeds energy into the back-up capacitor via the switching elements.

9 Claims, 4 Drawing Sheets

SPRING-LOADED DRIVE WITH ACTIVE FEEDBACK IN DC CIRCUIT

CROSS REFERENCE TO RELATED APPLICATIONS

This application is based on and hereby claims priority to European Application No. 11182832 filed on Sep. 26, 2011, the contents of which are hereby incorporated by reference.

BACKGROUND

Described below is an electrical drive,
wherein the drive has a motor and a motor control for the motor,
wherein the motor control has a DC circuit and a switching device,
wherein a back-up capacitor is disposed in the DC circuit,
wherein the DC circuit is connected to a power supply network for feeding energy into the back-up capacitor and the motor is able to be connected to the back-up capacitor via the switching device,
wherein the motor has a stator and a rotor supported rotatably relative to the stator,
wherein the rotor is connected to a spring device by which a restoring force can be applied to the rotor in the event of it being deflected from its idle position,
wherein a control device controlling the switching device for the motor, in the event of energy being fed into the back-up capacitor from the power supply network, activates switching elements of the switching device, as a function of a required deflection of the rotor prespecified to the control device from outside, such that an actual deflection of the rotor is adjusted to the required deflection.

An electrical drive of the type described above is known from WO 2005/119 898 A2.

Spring-loaded drives are often used as drives for valves and flaps in order to guarantee that the valve or flap is moved to a defined position in the event of a failure of the power supply network.

Negative effects can occur when the spring restores the rotor. In particular this can result in a mechanical collision of the restored element which can lead under extreme conditions to mechanical damage. Furthermore electrical energy is generated when the rotor is restored, which must be accommodated and dealt with by the motor control.

In WO 2005/119 898 A2 the motor is embodied as a brushless DC motor. In WO 2005/119 898 A2, to avoid the above problems, it is proposed that two of three windings of the motor be short-circuited through pulse width modulation by the converter and thereby the rotor be moved at a restricted speed into its idle position.

The teaching of WO 2005/119 898 A2 only resolves the above-mentioned problems partly. In particular impact of the valve or flap is avoided. However a high short-circuit current arises which must be dealt with by the motor and by the switching device. Furthermore the voltages occurring in the motor must be dealt with by the switching device.

SUMMARY

An aspect is thus to further develop an electrical drive of the type stated above such that the problems of the related art are completely eliminated.

In what is described below, there is provision for embodying an electrical drive of the type stated at the start in that,
the control device is able to be supplied with energy by the back-up capacitor and
the control device, in the event of the supply of energy into the back-up capacitor from the power supply network failing in the state in which the rotor is deflected from the idle position, automatically sets the required deflection to the idle position and activates the switching elements of the switching device such that the motor, at least at the beginning of being restored by the spring device, feeds energy into the back-up capacitor via the switching elements of the switching device.

Because of the supply of the control device with energy via the back-up capacitor the control device is connected as a load to the back-up capacitor. The control device thus counteracts too large a voltage increase at the back-up capacitor through its power consumption. Because of the activation of the switching elements of the switching device the fed back current can flow via the switching elements of the switching device itself—by contrast with intrinsically present freewheeling diodes of the switching element only able to carry current to a restricted degree. This relieves the electrical load on the switching device. As a result of the further operation of the control device and the deviation of the actual deflection of the rotor from the—newly set—required deflection, an essentially braked transfer of the rotor into the idle position occurs, as also in normal operation.

It is possible, in the event of the failure of the supply of energy into the back-up capacitor from the power supply network, to provide a specific type of activation of the switching elements of the switching device. Simpler, and thus desirable, however is that the control device activates the switching elements of the switching device in the same way in the event of the supply of energy from the power supply network failing in the deflected state of the rotor as it does in the case in which energy is being supplied from the power supply network and the required deflection of the rotor is set from outside to the idle position. This method does not require any change in the control behavior of the control device. The required deflection merely has to be set to the value 0.

Preferably there is provision for the control device to activate the switching elements of the switching device in the event of the supply of energy from the power supply network failing in the deflected state of the rotor, such that the rotor is moved into its idle position at a controlled speed or at a restricted speed.

The motor can especially be embodied as a multiphase motor. In this case the switching elements of the switching device as a rule include upper and lower switching elements, with each phase of the motor being able to be connected by a respective upper switching element to an upper potential of the back-up capacitor and via a respective lower switching element to a lower potential of the back-up capacitor. In the event of energy being supplied from the power supply network, for each phase the respective upper and the respective lower switching element are activated by the control device in push-pull mode. In what is described below, this type of activation is also retained in the event of the supply of energy from the power supply network failing in the deflected state of the rotor.

It is possible to constantly undertake the feedback of electrical energy into the back-up capacitor in the event of the supply of energy into the back-up capacitor from the power supply network failing. Preferably however, in the event of the supply of energy from the power supply network failing in the deflected state of the rotor, the control device determines an energy state of the DC circuit during the supply of energy into the back-up capacitor. This means that it is in a position to adjust the activation of the switching elements of the switching device when the energy state of the DC circuit falls below a minimum energy.

To detect the energy state of the DC circuit the control device can for example detect a current fed via the switching device into the DC circuit or the back-up capacitor. As an alternative, for detecting the energy state of the DC circuit, the control device can detect a voltage present at the back-up capacitor.

As already mentioned, the drive is often used as a valve or flap drive. Preferably the rotor is thus connected directly or via a transmission to a valve or a flap.

The motor can especially be embodied as a brushless DC motor.

BRIEF DESCRIPTION OF THE DRAWINGS

The characteristics, features and advantages described above, as well as the manner in which these are achieved, will become clearer and more comprehensible in conjunction with the description given below of the exemplary embodiments, which are explained in greater detail in connection with the drawings of which.

DETAILED DESCRIPTION OF THE PREFERRED EMBODIMENT

Figure 1:
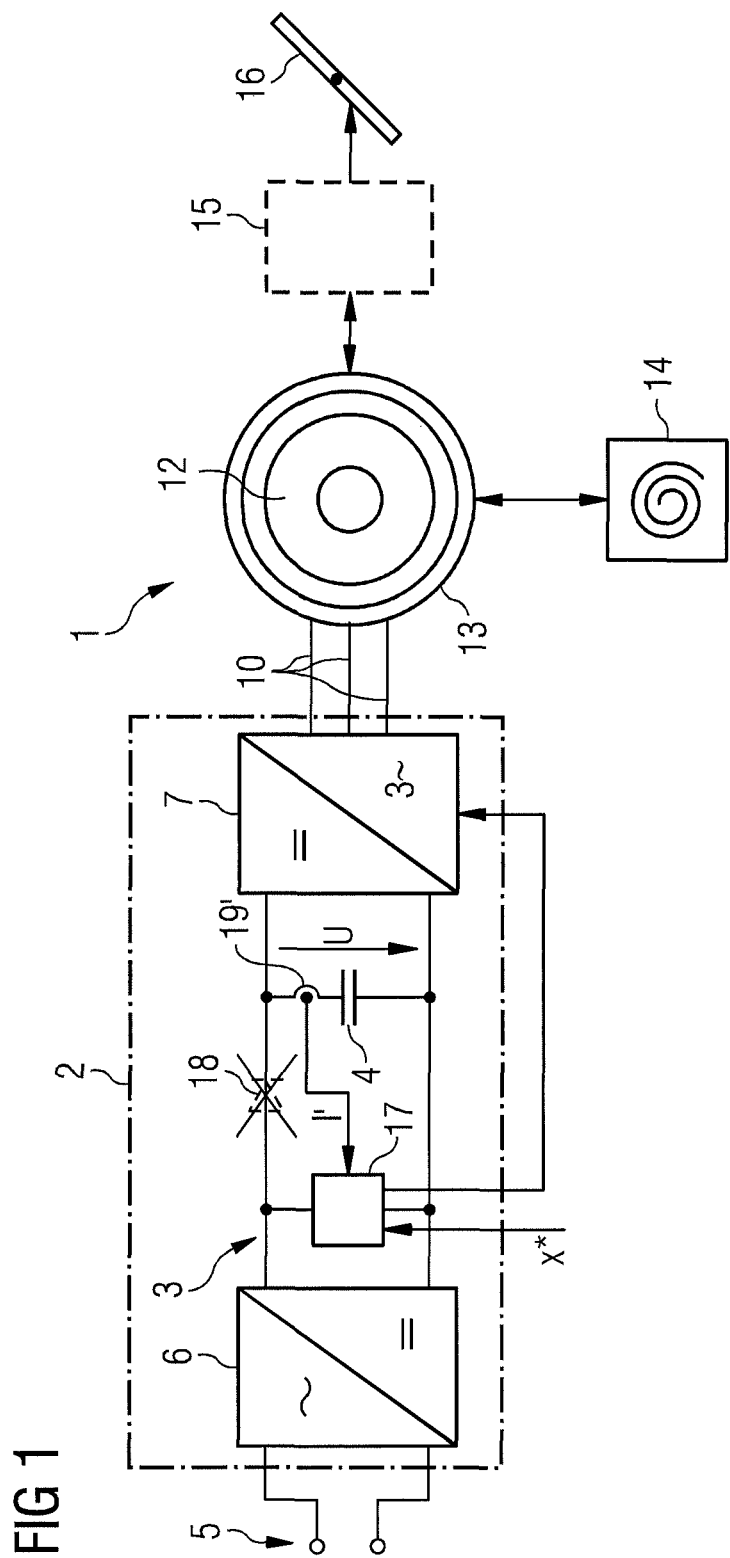
FIG. 1 is a schematic block diagram of an electrical drive.

Reference will now be made in detail to the preferred embodiments, examples of which are illustrated in the accompanying drawings, wherein like reference numerals refer to like elements throughout.

In accordance with FIG. 1 an electrical drive has a motor 1 and a motor control 2 (motor control circuit 2). The motor 1 can be embodied as required. For example the motor 1 can be embodied as a permanently-excited synchronous machine. Preferably the motor 1 is embodied in accordance with the diagram shown in FIG. 2 as a brushless DC motor, especially as a multiphase brushless DC motor. In a similar manner the motor 1 can be embodied as required as an internal rotor—or—as shown in the diagram in FIG. 1—as an external rotor motor. The motor circuit 2 serves to supply the motor 1 with electrical energy and to control the motor 1.

The motor circuit 2 features a DC circuit 3. One of the components arranged in the DC circuit 3 is a back-up capacitor 4.

The DC circuit 3 is connected to a power supply network 5 for feeding energy into the back-up capacitor 4. For example in accordance with the diagram shown in FIG. 1 a rectifier 6 can be present which connects the DC circuit 3 to the single-phase or three-phase public supply network (rated voltage for single-phase network 100 V, 110 V or 230 V, mains frequency 50 Hz or 60 Hz). Other power supplies are also possible, for example 24 V DC and under some circumstances even low voltages below 24 V.

The motor circuit 2 is also a switching device 7. Via the switching device 7 the motor 1 is able to be connected to the back-up capacitor 4. For this purpose the switching device 7 has switching elements 8, 9 in accordance with FIG. 2. The motor 1 is as a rule embodied as a multiphase motor. Usually the switching elements 8, 9 of the switching device 7, for each phase 10 of the motor 1, include an upper switching element 8 and a lower switching element 9 in each case. The respective phase 10 of the motor 1 is able to be connected by the respective upper switching element 8 to an upper potential of the back-up capacitor 4. In a similar manner the respective phase 10 is able to be connected by the respective lower switching element 9 to a lower potential of the back-up capacitor 4.

The switching elements 8, 9 are as a rule embodied as semiconductor switching elements, for example as MOSFETs or as IGBTs. They feature intrinsic freewheeling diodes 11. The freewheeling diodes 11 are unavoidable for manufacturing reasons. The freewheeling diodes 11 thus do not involve separate components from the switching elements 8, 9 which could basically be omitted, but instead are unavoidably present in any event.

In accordance with FIG. 1, the motor 1 has a stator 12 and a rotor 13. The rotor 13 is supported rotatably relative to the stator 12. By appropriate connection of a voltage U present at the back-up capacitor 4 (referred to below as the DC link circuit voltage U) a corresponding torque can then be executed on the rotor, so that the rotor 13 is turned.

In accordance with FIG. 1 the rotor 13 is linked to a spring device 14. The spring device 14 is tensioned and relaxed as the rotor 13 turns. The spring device 14 exhibits a state in which it is (completely) relaxed or even not completely relaxed, but—as a result of an impact for example—no longer exercises any restoring force on the rotor 13. The corresponding position of the rotor 13 corresponds to an idle position of the rotor 13. In every other deflection of the rotor 13 the rotor 13 has a restoring force applied to it by the spring device 14, i.e. the force applied restores the rotor 13 to the idle position.

The rotor 13 can be connected to a flap 16 or a valve 16 for example—be it directly, be it via the transmission 15 shown as a dashed outline in FIG. 1.

According to FIG. 1 the motor circuit 2 also has a control device 17 for the motor 1. The control device 17 serves to control the switching device 7, especially the switching elements 8, 9. They are supplied with electrical energy via the back-up capacitor 4. The control device 17 is thus either arranged between the back-up capacitor 4 and the switching device 7 but also, in accordance with the diagram shown in FIG. 1, is arranged in front of the back-up capacitor 4, wherein, in the latter case, no decoupling takes place of the control device 17 from the back-up capacitor 4 through a correspondingly arranged decoupling diode 18. The decoupling diode 18 is thus only shown in FIG. 1 by dashed lines and has a cross through it.

As a rule electrical energy is—naturally—fed into the back-up capacitor 4 from the power supply network 5. This state is referred to below as normal operation. It is however possible for the power supply network 5 to fail. This state is referred to below as emergency operation.

In normal operation the control device 17 activates the switching elements 8, 9 of the switching device 7. The elements are activated as a function of a required deflection x* of the rotor 13. The required deflection x* is prespecified to the control device 17 from outside in normal operation in accordance with FIG. 1, for example via an input device not shown in the figure, by a person or by a higher-ranking control device likewise not shown in the figure.

Figure 3:
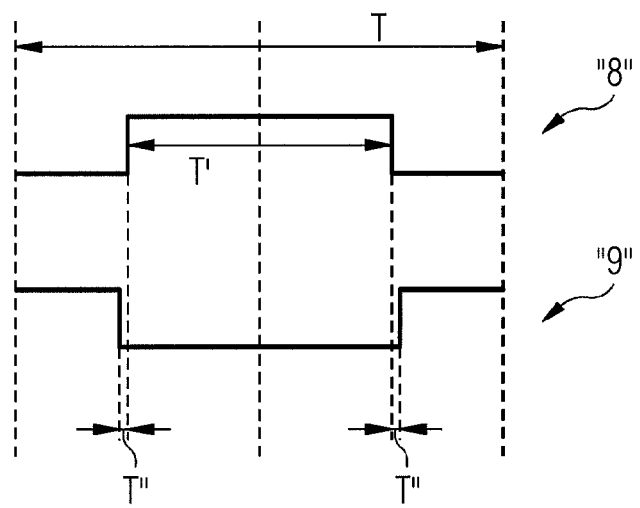
FIG. 3 is a switching diagram illustrating switch positions.

The control device 17 controls the switching elements 8, 9 such that an actual deflection of the rotor 13 is adjusted to the required deflection x*. The corresponding activation of the switching elements 8, 9 of the switching device 7 is generally known to persons skilled in the art. In particular the control device 17 activates the upper and the lower switching elements 8, 9, as a rule by pulse width modulation and above all in push-pull mode. In relation to any one of the given phases 10—see FIG. 3—activation takes place in clock cycles T wherein, within the respective clock cycle T during an activation period T' of the respective phase 10, the respective upper switching element 8 is switched to "live". The corresponding lower switching element 9 is switched during the activation period T' to "disabled". Conversely, outside the activation period T', the upper switching element 8 is switched by the control device 17 to "disabled". The lower switching element 9 on the other hand is switched outside the activation period T' to "live". An exception only applies during very short switchover periods T", in which, to avoid a short circuit, both the upper and also the lower switching element 8, 9 of the respective phase 10 are disabled.

Because of the fact that the rotor 13 is connected to the spring device 14, in normal operation the rotor 13 must have a torque permanently applied to it in order to compensate for the restoring force of the spring device 14. An exception only applies when the required deflection x* corresponds to the idle position of the rotor 13.

Figure 4:
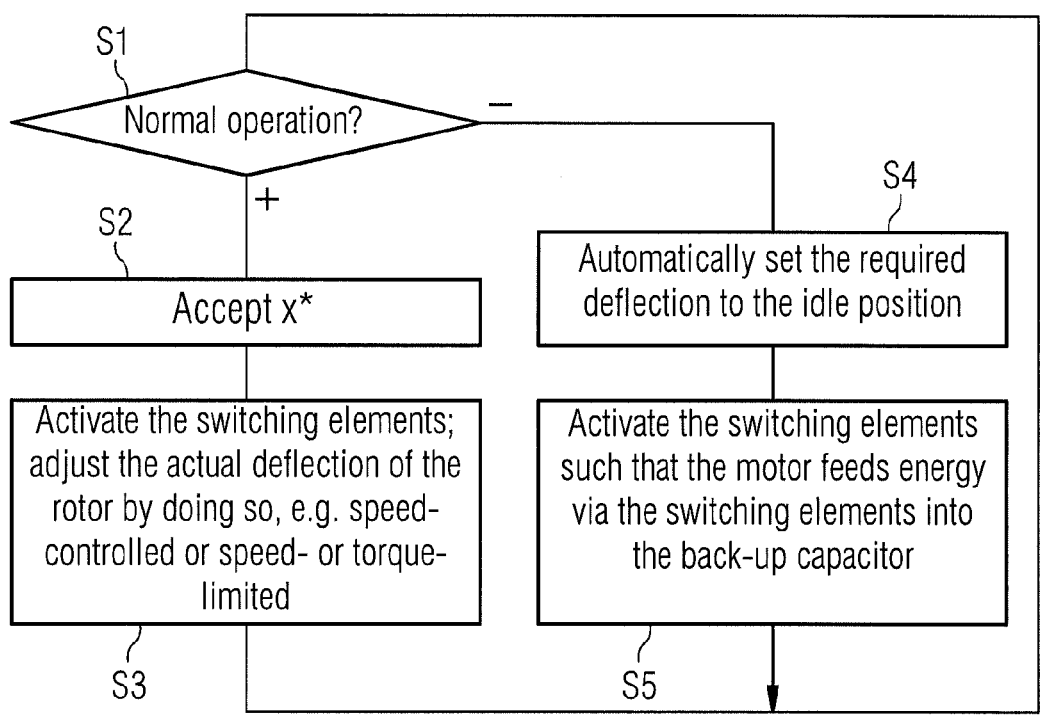
FIG. 4 is a flow diagram.

If the energy supply from the power supply network 5 fails, i.e. when emergency operation occurs, the motor 1 can only still be supplied for a short time with electrical energy from the back-up capacitor 4. After this the restoring force of the spring device 14 gains the upper hand. For this case the control device 17 must ensure by corresponding activation of the switching device 7 that critical operating states of the drive are avoided. The control device 17 is thus embodied—for example programmed—such that it implements the operating mode explained below in conjunction with FIG. 4:

In S1 of FIG. 4, the control device 17 checks whether energy is being supplied to the DC circuit 3 from the power supply network 5. Depending on the result of the check, the control device 17 goes to a S2 or to S4.

In S2, the control device 17 accepts the required deflection x* of the rotor 13. In a S3, the control device 17 controls the switching elements 8, 9 of the switching device 7 so that the actual deflection of the rotor 13 is adjusted to the required deflection x*. The adjustment of the actual deflection can for example be speed-controlled, speed-restricted or torque-limited. The corresponding regulation scheme and the corresponding determination of the activation scheme for the switching elements 8, 9 of the switching device 7 are known to persons skilled in the art.

If, on the other hand, the energy supply from the power supply network 5 fails, the control device 17 goes to S4. In S4, the control device 17 automatically sets the required deflection x* to the idle position. Furthermore the control device 17 controls the switching elements 8, 9 of the switching device 7 in S5 such that the motor 1 feeds energy via the switching elements 8, 9 of the switching device 7 into the back-up capacitor 4. The control device 17, especially also in emergency operation, thus controls the upper and the lower switching elements 8, 9 in phases in push-pull mode.

The exact type of transfer of the rotor 13 into the idle position can be determined as required within the framework of S5. For example the control device 17, in a similar way to the operations at S3, can activate the switching elements 8, 9 of the switching device 7 such that the rotor 13 is moved at a controlled speed or a restricted speed into the idle position.

The energy fed into the back-up capacitor 4 initially increases the DC link circuit voltage U in emergency mode. Since however the control device 17 is supplied with electrical energy via the back-up capacitor 4—and in fact fully, i.e. to the same extent as in normal mode—the control device 17 counteracts too great an increase in the DC link circuit voltage U by its power consumption.

The manner in which the corresponding activation signals for the switching elements 8, 9 must be determined within the framework of the operations at S5 is known to persons skilled in the art per se. In particular the control device 17 can determine the activation signals for the switching elements 8, 9 in the same way as in normal operation, if the required deflection x* there is set from outside to the idle position. Under some circumstances the operations at S5 can thus be omitted completely. In this case the sequence goes from S5 to S3.

With the method of operation explained above in conjunction with FIG. 4, in emergency operation the motor 1 feeds energy into the back-up capacitor 4 not only at the beginning of the restoration of the rotor 13, but constantly. This method of operation is readily possible. However it often leads to better results if the operation of FIG. 4 is modified in accordance with FIG. 5.

Figure 5:
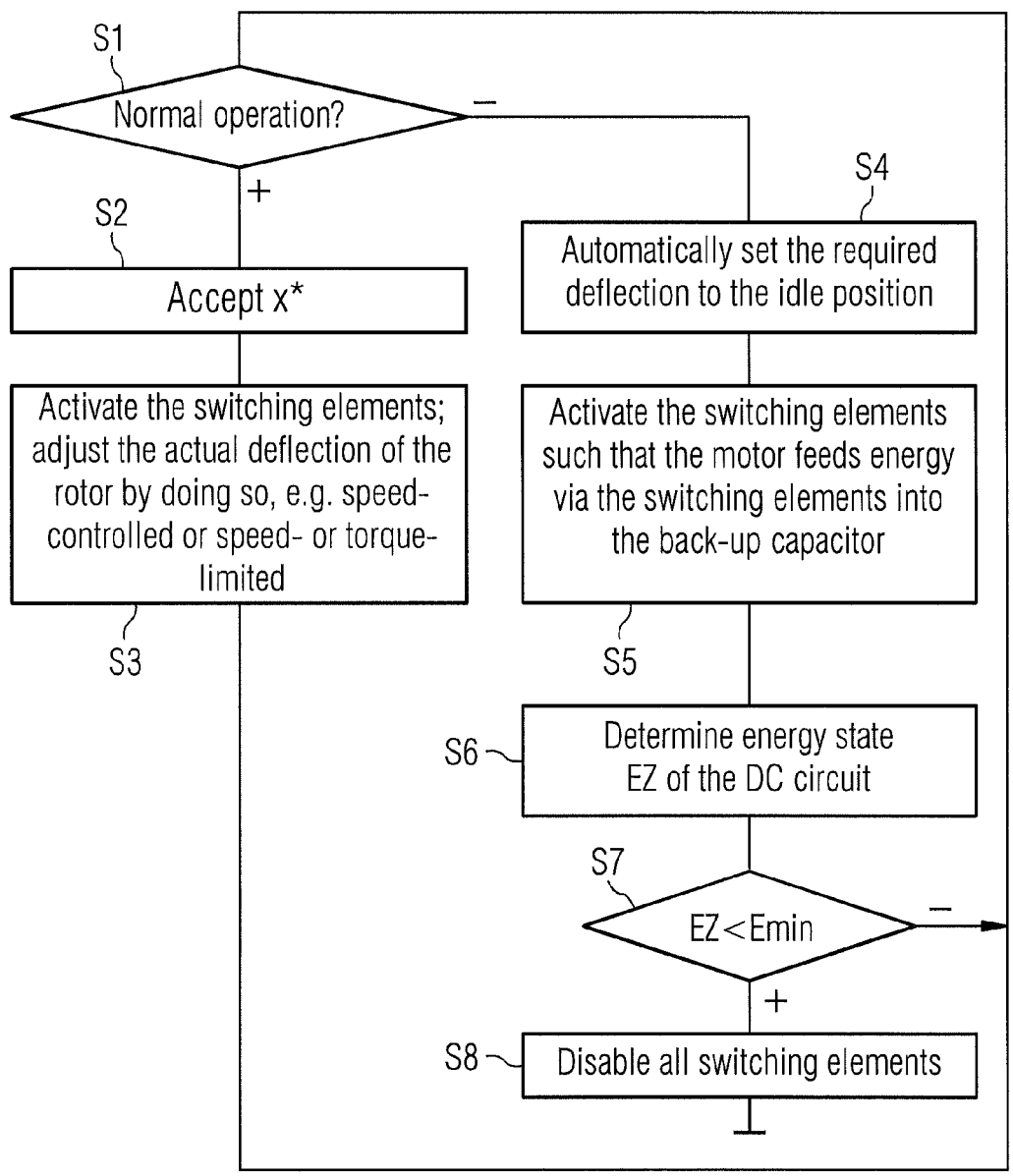
FIG. 5 is a further flow diagram.

In accordance with FIG. 5—in addition to the operations at S1 to S5—further operations at S6 to S8 are present.

In S6, the control device 17 determines an energy state EZ of the DC circuit 3. Because of the fact that S6 follows S5, the determination at S6 is executed at a time at which energy is being fed into the back-up capacitor 4 from the motor 1 via the switching device 7.

Figure 2:
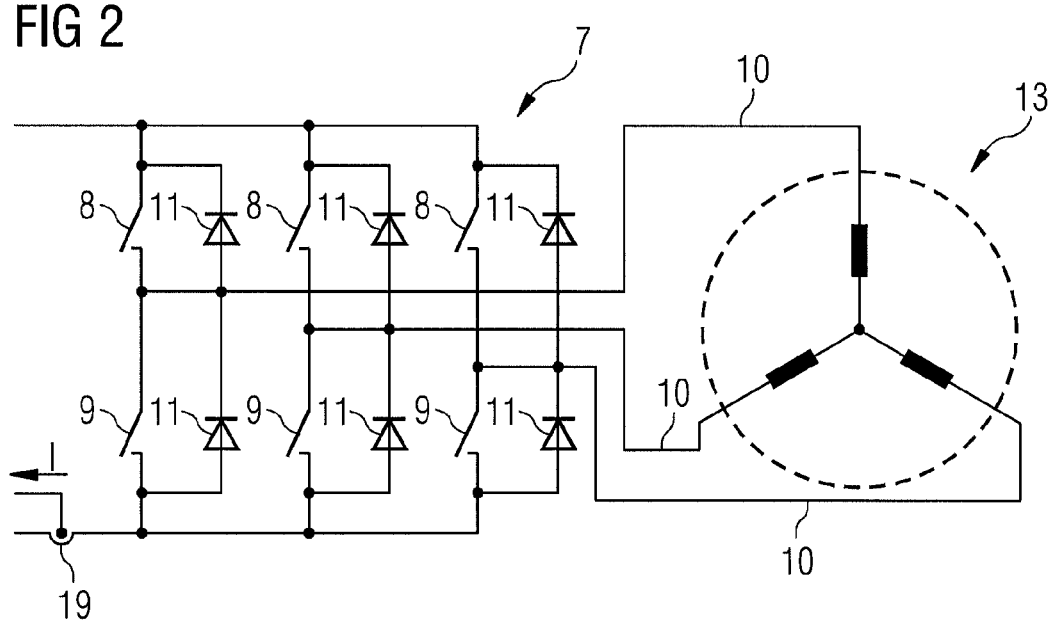
FIG. 2 is an electrical circuit diagram of a motor and a switching device.

To determine the energy state EZ of the DC circuit 3 the control device 17 can detect the current I fed by the switching device 7 into the DC circuit 3, via an appropriately arranged current measurement device 19 for example (see FIG. 2). As an alternative or in addition the control device 17 can detect via an appropriately arranged current measurement device 19' (see FIG. 1) the current I' fed into the back-up capacitor 4 itself. As an alternative or in addition the control device 17 in accordance with FIG. 1 can detect the DC link circuit voltage U present at the back-up capacitor 4.

In S7, the control device 17 checks whether the determined energy state EZ of the DC circuit 3 lies above a minimum energy Emin. Depending on the result of the test, the control device 17 by then goes to S1 or to S8. If the control device 17 goes to S8, it disables all switching elements 8, 9 of the switching device 7 in S8.

The embodiment in accordance with FIG. 5 thus has the effect that in emergency operation electrical energy is only fed into the back-up capacitor 4 at the beginning of the restoration of the rotor 13. If the energy state EZ of the DC circuit 3 falls below the minimum energy Emin, the control device 17 stops the activation of the switching elements 8, 9 instead.

Advantages include a simplified control method for the switching elements 8, 9 is produced. Furthermore, the switching elements 8, 9 and also the back-up capacitor 4 can be dimensioned smaller than in the related art. Furthermore, overloading of the freewheeling diodes 11 is avoided. Finally mechanical stresses of the motor 1, the transmission 15 and the flap 16 or the valve 16 can be avoided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:
1. An electrical drive connectable to a power supply network, comprising:
   a motor having a stator and a rotor supported rotatably relative to the stator;

a spring device linked to the rotor to apply a restoring force to the rotor when the rotor is deflected from an idle position; and a motor control for the motor, connectable to the power supply network, including a DC circuit with a back-up capacitor arranged in the DC circuit, the DC circuit feeding energy into the back-up capacitor when the power supply network is connected and the back-up capacitor supplying the control device with energy when the power supply network is not connected, a switching device, having switching elements, coupled to the motor to enable the motor to be connected to the back-up capacitor, a control device activating the switching device for the motor when energy is fed into the back-up capacitor from the power supply network, controlling the switching elements of the switching device, based on a required deflection of the rotor prespecified to the control device from outside the motor control to adjust an actual deflection of the rotor to the required deflection, and, when the rotor is deflected from the idle position and energy being fed into the back-up capacitor from the supply network fails, automatically setting the required deflection to the idle position and activating the switching elements of the switching device such that the motor, at least at the beginning of being restored by the spring device, feeds energy into the back-up capacitor via the switching elements of the switching device.

2. The electrical drive as claimed in claim 1, wherein the control device, when the feeding of energy from the power supply network fails in the deflected state of the rotor, activates the switching elements of the switching device as in a case in which energy is being fed in from the power supply network and the required deflection of the rotor is set from outside to the idle position.

3. The electrical drive as claimed in claim 2, wherein the control device activates the switching elements of the switching device when the feeding of energy from the power supply network fails in the deflected state of the rotor such that the rotor is moved into the idle position at one of a controlled speed and a restricted speed.

4. The electrical drive as claimed in claim 3,
wherein the motor is a multiphase motor,
wherein the switching elements of the switching device include upper and lower switching elements,
wherein each phase of the motor is able to be connected via a respective upper switching element to an upper potential of the back-up capacitor and via a respective lower switching element to a lower potential of the back-up capacitor, and
wherein for each phase the respective upper switching element and the respective lower switching element, both when the energy is fed in from the power supply network, and also when the feeding of energy from the power supply network fails in the deflected state of the rotor, are activated by the control device in push-pull mode.

5. The electrical drive as claimed in claim 4, wherein the control device, when the feeding of energy from the power supply network fails in the deflected state of the rotor, detects an energy state of the DC circuit during the feeding of energy into the back-up capacitor and sets the activation of the switching elements of the switching device if the energy state of the DC circuit falls below a minimum energy level.

6. The electrical drive as claimed in claim 1, wherein the control device detects the energy state of the DC circuit by detecting a current fed in via the switching device into the DC circuit or the back-up capacitor.

7. The electrical drive as claimed in claim 1, wherein the control device detects a voltage present at the back-up capacitor to detect the energy state of the DC circuit.

8. The electrical drive as claimed in claim 7, wherein the rotor is connected directly or via a transmission to a flap or a valve.

9. The electrical drive as claimed in claim 8, wherein the motor is a brushless DC motor.

* * * * *